United States Patent [19]

Shelbourn et al.

[11] Patent Number: 4,522,373
[45] Date of Patent: Jun. 11, 1985

[54] VALVE DETENT

[75] Inventors: William C. Shelbourn; Patrick Kuhn; Michael A. Vig, all of Bismarck, N. Dak.

[73] Assignee: Clark Equipment Company, Buchanan, Mich.

[21] Appl. No.: 529,241

[22] Filed: Sep. 6, 1983

[51] Int. Cl.³ .................... F16K 35/04; F15B 13/04
[52] U.S. Cl. ................................. 251/297; 91/464; 137/625.68; 137/625.69
[58] Field of Search ................ 91/464; 137/625.68, 137/625.69; 251/297

[56] References Cited

U.S. PATENT DOCUMENTS

| | | | |
|---|---|---|---|
| 2,238,768 | 4/1941 | Berglund et al. | 91/464 X |
| 2,594,664 | 4/1952 | Livers et al. | 137/624.27 |
| 2,862,518 | 12/1958 | McAlvay | |
| 2,985,147 | 5/1961 | Rockwell | 91/464 X |
| 3,106,065 | 10/1963 | Stacey | |
| 3,263,574 | 8/1966 | Tennis | 137/625.69 |
| 3,346,012 | 10/1967 | Williams | 137/625.69 |
| 3,602,245 | 8/1971 | Meisel | 251/297 X |
| 3,738,379 | 6/1973 | Wilke | 137/106 |
| 3,884,123 | 5/1975 | DeVita | 91/447 |
| 4,049,235 | 9/1977 | Singleton | 251/297 |
| 4,185,660 | 1/1980 | Fan | 251/297 X |

Primary Examiner—Gerald A. Michalsky
Attorney, Agent, or Firm—Kenneth C. Witt; John C. Wiessler

[57] ABSTRACT

A detent mechanism for a hydraulic control valve, having a detent position in which a detent member is in engagement with a groove and a spring urges the detent member into the groove so that a predetermined force is required to move the detent member out of the groove. A second spring loaded detent member is provided which requires the application of another predetermined force in order to move the mechanism into the detent position. The springs for both of the detent members can be readily changed to adjust the forces required to operate them.

3 Claims, 4 Drawing Figures

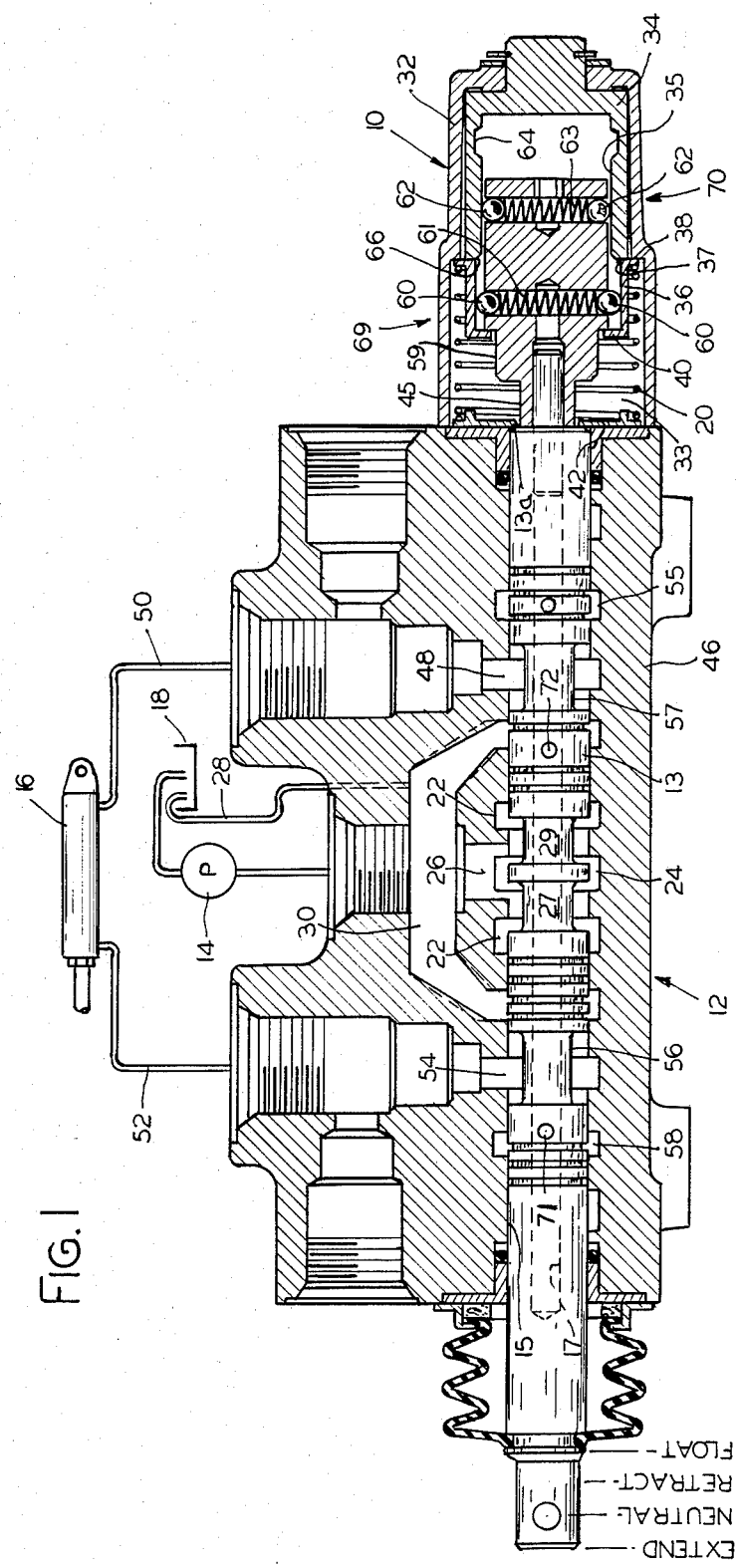

VALVE DETENT

BACKGROUND OF THE INVENTION

1. Field of the Invention

This invention relates to detent mechanisms for use in or with hydraulic control valves to provide desirable operating characteristics for such valves.

2. Description of the Prior Art

It is known to use various detent and other mechanisms to provide desired operating characteristics for hydraulic valves. U.S. Pat. Nos. 2,862,518, 3,106,065, 3,346,012, 3,738,379, 3,884,123, and 4,049,235 are illustrative of such prior art mechanisms.

SUMMARY OF THE INVENTION

In carrying out the present invention we provide a detent mechanism located at one end of a spool valve. The spool valve has at least two operating positions and one of them is a detent position. One detent member in the detent mechanism is operative to increase the resistance felt by the operator as the valve spool approaches the detent position. Another detent member enters a groove in the detent position where the valve is held until the operator overcomes a predetermined resistance to move the valve out of the detent position. Both of the detent members are operated by springs which are arranged so that they can be readily changed to alter the operating characteristics of the valve.

BRIEF DESCRIPTION OF THE DRAWING

FIG. 1 is a plan view, mostly in section, which includes a valve and a detent mechanism embodying the present invention;

FIG. 2, showing the detent mechanism only, illustrates another position of such mechanism;

FIG. 3 shows a third position of the detent mechanism; and

FIG. 4 shows a fourth position of the detent mechanism.

DESCRIPTION OF A PREFERRED EMBODIMENT

Referring to the drawing, the detent mechanism of the present invention is indicated generally by the numeral 10. As shown, the detent mechanism is mounted on and forms an integral part of an open center type spool valve which is indicated by the numeral 12. Valve 12 controls the supply of hydraulic fluid from a pump 14 which supplies a double acting hydraulic cylinder 16, providing in this preferred embodiment four positions for the valve and detent mechanism, which are, extend, neutral, retract and float as indicated on FIG. 1 of the drawing. A centering spring 20 forming a part of detent mechanism 10 urges the spool 13 of the valve 12 to the neutral position unless the operator manually moves the spool to one of the other positions.

In the neutral position of the valve 12 illustrated in FIG. 1 hydraulic fluid is circulated continually from pump 14 through the valve 12 and back to reservoir 18, in the usual manner for an open center system, the pressure exerted by pump 14 being only that which is required to overcome the internal resistance of the valve 12 and other parts of the hydraulic circuit; the complete loop for the flow of hydraulic fluid in the neutral position includes inlet passages 22 in the body 46 of valve 12 and then through bore 15 of the valve 12 by way of grooves 27 and 29 in spool 13 to conduit 28 and reservoir 18. At the same time hydraulic fluid enters parallel inlet passage 26 and goes on into passage 30; in the neutral position the fluid in parallel inlet 26 and passage 30 is stationary.

Referring to the detent mechanism 10, such mechanism comprises an outer housing member 32, which defines an opening 33, an axially movable detent spool member 59 inside the housing 32, and an inner fixed sleeve member 34 having an inner bearing surface 35 for the reciprocal axial movement of spool 59 therein. Also included inside the housing 32 is a movable sleeve member 36 which has an outwardly extending shoulder portion 38 at the outer end—right end as seen on the drawing—of the movable sleeve and an inwardly extending shoulder portion 40 at the inner end of sleeve 36. Centering spring 20 is held between shoulder 38 and a spring retainer member 42 which has an opening in it that permits the reduced diameter portion 45 of detent spool 59 to move through it as spool 59 moves inwardly. When this occurs in moving the detent mechanism to the extend position of FIG. 2 the sleeve member 36 moves with detent spool 59 because shoulder portion 40 is engaged by and moves with member 36. Likewise the shoulder portion 38 on member 36 which is engaged by spring 20 moves with spool 59 and compresses spring 20, thus urging the valve and detent mechanism back to neutral. When spool 13 moves outwardly the shoulder 13a on spool 13 causes spring retainer 42 also to move to outwardly. This occurs when the valve and detent mechanism are moved to the retract position of FIG. 3. The shoulder 38 abuts against a portion of housing 32 and cannot move outwardly; therefore the spring 20 is compressed and urges the detent spool back to neutral. The fixed housing 32 is rigidly secured at its inner margin to the housing or body portion 46 of the spool valve structure.

FIG. 1 of the drawing indicates at the left end of spool 13 the four positions of the valve spool 13 and detent spool 59. In FIG. 2, the detent mechanism 10 is shown in the innermost position, and it will be understood, of course, that valve spool 13 has been moved to its extend position, in which position the flow of pressurized fluid from inlet passages 22 to outlet passage 24 is interrupted and pressurized fluid is then directed through parallel inlet 26 into passage 30 and then into work passage 48 to pressurize the head end of hydraulic cylinder 16 through conduit 50 to extend the cylinder 16. At the same time hydraulic fluid is discharged from the rod end of the hydraulic cylinder 18 through conduit 52 and work passage 54 and through groove 56 in the spool 13 into exhaust passage 58. In this position of the spool 13 pressurized fluid moves continuously through passageway 48 into the hydraulic cylinder 16 until spool 13 moves from the extend position back to neutral or other position.

FIG. 3 of the drawing illustrates the detent mechanism in the extend position and of course the valve spool 13 has moved in unison. The detent mechanism 10 includes in addition to the parts previously described two sets of detents carried by detent spool 59. One set, indicated generally by the numeral 69, comprises two metal balls 60 located in a diametral opening in detent spool 59 with a spring 61 between the two balls 60 urging them radially outwardly against internal surface or wall 37 of sleeve 36 except in the float position. The other set of detents 70 comprises metal balls 62 in another diametral opening through detent spool 59, with the balls 62 being separated by a spring 63 which urges them radially outwardly against internal surface or wall 35. Also included in the detent mechanism is a groove 64 the function of which is explained later, and a ramp portion 66 at the inner extremity of member 34 the purpose of which also is explained later. While balls have been shown for the detent members 60 and 62 it will be understood that the detent members may be of other configurations if desired.

In the extend position of FIG. 3 it will be observed that detent members 60 are in contact with ramp 66. When the valve spool 13 is in the position corresponding to FIG. 3 pressurized fluid flows from the pump 14 through passage 26 and passage 30 through groove 56 into work passage 54 and then through conduit 52 into the rod end of cylinder 16. At the same time fluid returns from the head end of cylinder 16 through conduit 50 and moves through groove 57 in spool 13 from where it goes through passageway 55 back to reservoir 18.

In the position of the detent mechanism illustrated in FIG. 4 the valve 12 is in the float position. In this position an axial chamber 17 in spool 13 is utilized to interconnect the two ends of the cylinder 16 so that such cylinder will move according to external forces applied to the cylinder by a boom arm or other mechanism which is operated by the hydraulic cylinder. This occurs because opening 71 through the wall of the spool into chamber 17 is in register with work passage 54, while opening 72 through the wall of the spool is in register with work passage 48, thus completing a hydraulic circuit between the two ends of the hydraulic cylinder through the chamber 17 in spool 13.

It will be observed that as the detent spool 59 moves from the position of FIG. 3 to the position of FIG. 4 it is necessary for the detent members 60 to move radially inwardly against the force of spring 61 in order to move past the ramp 66. Such action of these detent members augments the resistance which is present because of the centering spring 20, thus providing for the operator to feel when the valve 12 and detent mechanism 10 are about to move into the float position. As shown in the float position of FIG. 4 the detents 62 are in engagement with the groove 64 in the inner wall of member 34. This means that when the operator moves the valve from the float position to another position he must overcome the force of spring 63 in order to get the detents 62 out of the groove 64.

The feel that the valve is approaching the float position and the other feel that it is about to come out of the float position are important in the operation of various implements which are operated by hydraulic cylinders. The present invention, because of the use of two sets of detents which are housed within the detent spool and for which the loading springs can be easily changed makes it possible readily to change the feel which the operator senses as the valve and detent mechanism go into the float position and again as they are moved out of the float position.

While the invention has been described and illustrated herein by reference to a four-position open center valve, and in the form which is the best mode contemplated for carrying out this invention, it will be appreciated that modifications may be made by those skilled in the art. Accordingly it should be understood that we intend to cover by the appended claims all such modifications which fall within the true spirit and scope of our invention.

We claim:

1. A detent mechanism for a hydraulic control valve which has a valve housing having a bore therein and a multi-position spool located in said bore and movable longitudinally therein, the detent mechanism comprising,
   a detent housing secured on said valve housing,
   said detent housing defining an opening which is coaxial with said bore,
   a first wall portion and a second wall portion in said detent housing and a groove in said first wall portion,
   a detent spool connected to said valve spool for conjoint movement therewith and operative in said detent housing,
   a first detent member carried by said detent spool and arranged to engage said groove in a detent position of said valve,
   a first spring carried by said detent spool which urges said first detent member into contact with said first wall portion,
   a second detent member carried by said detent spool and arranged to engage said second wall portion,
   a second spring carried by said detent spool which urges said second detent member into contact with said second wall portion in at least one valve position,
   a ramp on said first wall portion arranged to be engaged by said second detent member to provide increased resistance to axial movement of said valve spool as said first detent member approaches said groove at said detent position,
   said second wall portion comprising a movable sleeve member which interacts with said detent spool, and
   said movable sleeve member having an outwardly extending shoulder, a spring retainer, and a centering spring held between said shoulder and said spring retainer.

2. A detent mechanism as in claim 1 wherein said movable sleeve member moves in unison with said detent spool in one axial direction from a neutral position but does not move with said detent spool in the other direction, and said spring retainer moves in unison with said detent spool in the other direction from neutral but does not move with said detent spool in said one direction.

3. A detent mechanism as in claim 2 wherein said ramp is at the axial extremity of a fixed sleeve comprising said first wall portion which is adjacent said second wall portion.

* * * * *